(12) United States Patent
Jamin et al.

(10) Patent No.: US 12,424,739 B2
(45) Date of Patent: Sep. 23, 2025

(54) RFID TRANSCEIVER WITH IMPLEMENTED PHASE CALIBRATION, AND PHASE CALIBRATION METHOD

(71) Applicant: NXP B.V., Eindhoven (NL)

(72) Inventors: Olivier Jérôme Célestin Jamin, Sainte Honorine du Fay (FR); Amandine Lesellier, Mondeville (FR)

(73) Assignee: NXP B.V., Eindhoven (NL)

(*) Notice: Subject to any disclaimer, the term of this patent is extended or adjusted under 35 U.S.C. 154(b) by 285 days.

(21) Appl. No.: 17/663,980

(22) Filed: May 18, 2022

(65) Prior Publication Data

US 2022/0399640 A1  Dec. 15, 2022

(30) Foreign Application Priority Data

Jun. 15, 2021 (EP) .................... 21290039

(51) Int. Cl.
  *H01Q 3/26* (2006.01)
  *G06K 7/10* (2006.01)
  *H04B 5/20* (2024.01)
  *H04B 17/21* (2015.01)

(52) U.S. Cl.
  CPC ......... *H01Q 3/267* (2013.01); *G06K 7/10297* (2013.01); *H04B 5/20* (2024.01); *H04B 17/21* (2015.01)

(58) Field of Classification Search
  CPC ..... H01Q 3/267; H04B 17/21; G06K 7/10297
  USPC ....................................... 342/174
  See application file for complete search history.

(56) References Cited

U.S. PATENT DOCUMENTS

| | | |
|---|---|---|
| 9,887,832 B1 | 2/2018 | Hueber et al. |
| 9,985,732 B2 | 5/2018 | Cordier |
| 10,019,608 B2 | 7/2018 | Neffe et al. |
| 10,237,000 B1 | 3/2019 | Buchsbaum et al. |
| 10,749,616 B2 | 8/2020 | Cordier |
| 2008/0266059 A1* | 10/2008 | Murofushi ............ H03D 3/008 340/10.3 |
| 2013/0201003 A1* | 8/2013 | Sabesan ............... G01S 13/878 340/10.1 |
| 2014/0218172 A1* | 8/2014 | Sadr .................. H03M 13/6331 375/229 |
| 2014/0321516 A1* | 10/2014 | Al-Qaq ................. H04B 17/29 375/221 |
| 2017/0270323 A1* | 9/2017 | Butler .............. G06K 19/07749 |
| 2018/0070198 A1 | 3/2018 | Cho et al. |
| 2019/0230611 A1* | 7/2019 | Houdebine ....... G06K 19/0723 |
| 2019/0325177 A1* | 10/2019 | Tornambe .............. H04B 5/77 |
| 2019/0363807 A1* | 11/2019 | Cordier ............ G06K 7/10237 |

(Continued)

*Primary Examiner* — William Kelleher
*Assistant Examiner* — Samarina Makhdoom

(57) ABSTRACT

There is described an RFID device, comprising: a transmitter, a matching device, and a receiver.
The transmitter is hereby coupled via the matching device to the receiver. The transmitter is configured to transmit a transmitter signal through the matching device, thereby obtaining a calibration signal. The receiver is configured to receive the calibration signal and estimate a phase shift of the calibration signal. Further, the RFID device is configured to adjust at least one of a transmitter phase shift and a receiver phase shift in order to compensate for the estimated phase shift.
Further, a method of calibrating a phase shift in an RFID device is described.

17 Claims, 3 Drawing Sheets

(56) References Cited

U.S. PATENT DOCUMENTS

2020/0036454 A1\* 1/2020 Aoki ................ H04B 17/11
2020/0169300 A1  5/2020 Moon et al.

\* cited by examiner

RFID TRANSCEIVER WITH IMPLEMENTED PHASE CALIBRATION, AND PHASE CALIBRATION METHOD

CROSS-REFERENCE TO RELATED APPLICATIONS

This application claims priority under 35 U.S.C. § 119 to European Patent Application No. 21290039.3, filed on Jun. 15, 2021, the contents of which are incorporated by reference herein.

TECHNICAL FIELD

The present disclosure relates to an RFID, in particular NFC, device with a transmitter, a receiver, and a matching device. Additionally, the present disclosure relates to a method of phase calibrating an RFID device. Further, the present disclosure relates to a method of using a loop between the transmitter, the matching device, and the receiver for phase calibration.

The disclosure may hence relate to the technical field of RFID and NFC communication applications.

TECHNICAL BACKGROUND

Near field communication (NFC) is widely used in a variety of applications including, for example, smartcards, smartphones, and similar devices including Radio Frequency Identification (RFID), to establish radio communication with each other by touching them together or bringing them into close proximity, for example within a short distance such as a few to several centimeters or inches.

Applications include, among others, contactless transactions, data exchange, and simplified setup of more complex communications such as Wi-Fi or Bluetooth. Various other types of communication applications include those between an RFID device such as an NFC-enabled mobile phone and another RFID device such as an NFC chip, called a "tag". Some of the applications involving identification products such as smart cards and RFID tags are used in endeavors such as transport (e.g., ticketing, road tolling, baggage tagging), finance (e.g., debit and credit cards, electronic purse, merchant card), communications (e.g., SIM card for GSM phone), and tracking (e.g., access control, inventory management, asset tracking).

The specific kind of task that RFID, in particular NFC, is performing at any given time may be determined by the operating mode. NFC devices for example allow for certain operating modes, for example card emulation mode (CEM) and reader(/writer) mode (RM).

The card emulation mode may place the RFID device in a passive communication mode and the device acts in a similar manner as a smart card. In particular, active load modulation (ALM) transmitters allow increasing the RFID/NFC communication distance by one order of magnitude and/or allow operating with much smaller antennas.

However, it may be required that the CEM transmitter phase is accurately locked to a phase of a further RFID device (being the reader), with a maximum phase error of +/-10°. If this phase accuracy is not achieved, the CEM ALM transmitter may not be able to interoperate with many world-wide applied readers which operate with a single-path (non-IQ). Unfortunately, RLC (resistor, inductor, capacitor), in particular SMD (surface mounted device) component, spread can cause phase shift spread in the matching device of an RFID device. This phase shift spread should be calibrated in order to guarantee a constant-across-production antenna signal phase (in other words, a calibrated phase at the RFID device antenna).

When working in reader/writer mode (RM), most RFID devices act as readers. The RFID device works in active mode to read the content of e.g. a tag. However, in the light of new developments like single-die integration of an NFC transceiver with e.g. a DC/DC converter (BOOST converter) and a secure element (for example when implementing the RFID device in a smart phone), may need new measures in terms of clock synchronization between a transmitter clock, a receiver clock, and a DC/DC converter clock, in order to minimize pollution of the receiver sampling instants by the DC/DC converter.

Among these measures, the receiver sampling phase may need to be optimized against the transmitter phase in order to get benefit from specific sampling positions. Since the receiver may operate near its sensitivity level, any additional noise or spur, e.g. coupled from the DC/DC converter to the receiver, may translate into a performance reduction.

Being able to control phase accuracy may be thus one of the key challenges of high-performance RFID transceivers/readers, especially in situation of low coupling between RFID devices (e.g. reader and card/tag).

OBJECT AND SUMMARY

There may be a need to provide an RFID, in particular NFC, device, wherein a phase calibration with high accuracy can be performed in an efficient, fast, and robust manner.

An RFID device, a method of phase calibrating an RFID device, and a method of using according to the independent claims are provided.

According to an aspect of the present disclosure, it is described an RFID device, comprising:
i) a transmitter,
ii) a matching device (e.g. matching network of an antenna), and
iii) a receiver.

The transmitter is hereby coupled via the matching device to the receiver (in particular as a loop).
a) The transmitter is configured to transmit a (unmodulated) transmitter signal (e.g. a square signal) through the matching device, thereby obtaining a calibration signal (signal as a basis for calibration).
b) The receiver is configured to receive the calibration signal (from the matching device) and estimate a phase shift (through the matching device/from transmitter to receiver, e.g. based on a delay/spread) of the calibration signal (for example using a carrier cancellation loop, see discussion below).
c) The RFID device (in particular the transmitter and/or the receiver) is configured to adjust a transmitter and/or receiver phase shift (in particular using a transmitter phase shifter and/or a receiver phase shifter) in order to compensate (at least partially) for the estimated phase shift (i.e. the phase is calibrated).

According to a further aspect of the present disclosure, a method of phase calibrating an RFID device is described. The method comprising:
i) transmitting (by a transmitter) an (unmodulated) transmitter signal through a matching device (coupled to the transmitter) of the RFID device in order to obtain a calibration signal,
ii) receiving the calibration signal (by a receiver coupled to the matching device) and estimating a phase shift from the calibration signal, and iii) adjusting a transmitter and/or receiver phase shift within the RFID device in order to compensate (at least partially) for the estimated phase shift.

According to a further aspect of the present disclosure, there is described a use of (method of using) a loop (established) from a transmitter via a matching network to a receiver (all of the same RFID device) in order to phase calibrate an RFID device.

In the context of the present disclosure, the term "RFID" (radio-frequency identification) may refer to a technique that uses electromagnetic fields (RF field) to communicate via short distances, in particular 10 meter or less. The term "RFID device" may refer to any device that has an RFID functionality. An RFID device may include an antenna and an integrated circuit with a transmitter and a receiver. A typical RFID system may include an RFID reader and one or more RFID tags which are associated to one or more objects. In an example, a first RFID device comprises a transmitter to transmit the RF signals to a second RFID device, and a receiver, to receive the modulated information of the second RFID device. The standard communication between RFID devices are specified in protocols.

In the context of the present application, the term "NFC" may refer to Near Field Communication which may be a short-range wireless technology (distances measured in centimeters). In order to make two NFC devices communicate, users may bring them close together or even make them touch. NFC may be considered as an established standard. In the present document, the NFC standard may be considered as a special form of RFID. In the context of the present document, the term "NFC device" may refer to any device that has an NFC functionality as described above. An NFC functionality may for example be implemented in a tag, a smart card, a card reader, or a mobile phone.

According to an exemplary embodiment, the present disclosure may be based on the idea that a highly accurate phase calibration in an RFID (in particular NFC) transceiver can be performed in an efficient (cost-efficient and highly accurate), fast, and robust manner, when a loop via transmitter, matching device, and receiver is established, so that a signal from the transmitter may serve as a calibration signal that is received at the receiver after it passed through the matching device. The receiver may hereby sample the calibration signal and estimate the phase shift (through the matching device). Based on the estimated phase shift, the RFID device may adjust the phase shift and thereby compensate for the estimated phase shift. The result may be a calibrated phase that can be applied in the two important operation modes of the RFID device, i.e. reader mode (RM) and card emulation mode (CEM). Estimation of the phase shift may be done for example by sampling the amplitudes of the calibration signal and obtaining independently an I-path signal and a Q-path signal in a carrier cancellation loop of the receiver.

The present disclosure may provide a way to calibrate an RFID/NFC signal phase shift caused by the spread of RLC components in the matching device. The described phase calibration may be implemented in a straightforward manner in existing devices. No test resources may be necessary, and thus, costs can be saved. Further, the described phase calibration may be extremely fast in comparison to conventional methods.

Due to the small calibration time, and no need for any external test resources, the calibration may have a negligible test time and cost, and may even be executed periodically during the lifetime of the RFID/NFC device (IC). Thus, the described technique may allow for improving phase accuracy (with a single-point calibration) which reduces test time and does not necessitate any external equipment.

The aspects defined above and further aspects of the disclosure are apparent from the examples of embodiment to be described hereinafter and are explained with reference to these examples of embodiment. The disclosure will be described in more detail hereinafter with reference to examples of embodiment but to which the disclosure is not limited.

DETAILED DESCRIPTION OF EMBODIMENTS

According to an embodiment, adjusting results in a calibrated phase at the receiver (in particular in the reader mode RM).

According to a further embodiment, the receiver is further configured to:
i) determine the phase shift between the transmitter and the receiver, and
ii) adjust said phase shift in order to obtain the calibrated phase at the receiver in the reader mode.

In this manner, the phase calibration may be done in order to obtain a particularly efficient and robust RM operating mode.

According to a further embodiment, the RFID device further comprises: an (NFC) antenna coupled to the matching device. Adjusting may result in a calibrated phase at the antenna (in particular in the card emulation mode CEM).

According to a further embodiment, the RFID device is further configured to:
i) determine a phase shift at the matching device, and
ii) adjust said phase shift in order to obtain the calibrated phase at the antenna in the card emulation mode.

In this manner, the phase calibration may be done in order to obtain a particularly efficient and robust CEM operating mode. According to an exemplary embodiment, in CEM (transmitter) mode, the phase shift correction is done on the transmitter.

According to a further embodiment, the receiver is further configured to sample the amplitude of the calibration signal. Thereby, phase shift information may be extracted from the calibration signal.

According to a further embodiment, the receiver comprises an estimation unit (in particular with a carrier cancelation loop) which is configured to provide an I-path signal and a Q-path signal based on the sampled amplitude. Further, the estimation unit is configured to estimate the phase shift based on the obtained I-path signal and the obtained Q-path signal (see FIG. 7 below for details). Thus, an established estimation technique may be directly implemented in the described phase calibration.

According to a further embodiment, the RFID device further comprises a transmitter phase shifter, coupled to the transmitter, and configured to adjust the transmitter phase shift in order to compensate (at least partially) for the estimated phase shift.

According to a further embodiment, the RFID device further comprises a receiver phase shifter, coupled to the receiver, and configured to adjust the receiver phase shift in order to compensate (at least partially) for the estimated phase shift.

According to a further embodiment, the RFID device further comprises a clock generator coupled to the transmitter and the receiver (in particular to the transmitter phase shifter and the receiver phase shifter, respectively). The clock generator is configured to synchronize a transmitter clock and a receiver clock and/or to tune the transmitter clock or the receiver clock (independently). Thereby, a reliable phase calibration may be assured.

According to a further embodiment, the transmitter signal is an unmodulated signal. For example, the signal may be a square-signal, a sinusoidal signal, a multi-layer signal, a continuous wave, etc. The unmodulated signal may be at least partially processed by the matching device, e.g. by a filter.

According to a further embodiment, the receiver further comprises a signal amplitude regulation unit configured to provide a signal amplitude close to a predefined value. This measure may improve the signal quality and thus the phase shift estimation. The signal amplitude regulation unit (e.g. an HF attenuation unit) may be implemented in the receiver, in particular in the estimation unit (see also FIG. 7, signal "g_hfatt").

According to a further embodiment, the RFID device is an NFC device (see definition above).

According to a further embodiment, the method is performed when the RFID device is coupled with a further RFID device. In particular performed, when there is no modulation of signals communicated between the RFID device and the further RFID device.

In this embodiment, the RFID device may adapt the transmitter and receiver clock phases before each transaction, or even before receiving every frame, form the further RFID device. The receiver and transmitter phases may be at optimum despite aging, and even despite antenna detuning (antenna detuning is caused by a coupling factor between reader and card antennas, which results in strong phase shift variations through the matching device). In all these situations, the receiver may still sample the transmitter signal at an accurate sampling point. In such a situation, step 9 (see FIG. 4 below) may be omitted.

In an embodiment, sampling instants of the RFID device (in particular a PCD device) are (essentially) independent of the further RFID device (in particular a PICC device). This may be even realized under strong detuning conditions.

BRIEF DESCRIPTION OF THE DRAWINGS

The illustrations in the drawings are schematic. In different drawings, similar or identical elements are provided with the same reference signs.

DETAILED DESCRIPTION OF EXEMPLARY EMBODIMENTS

Figure 1:
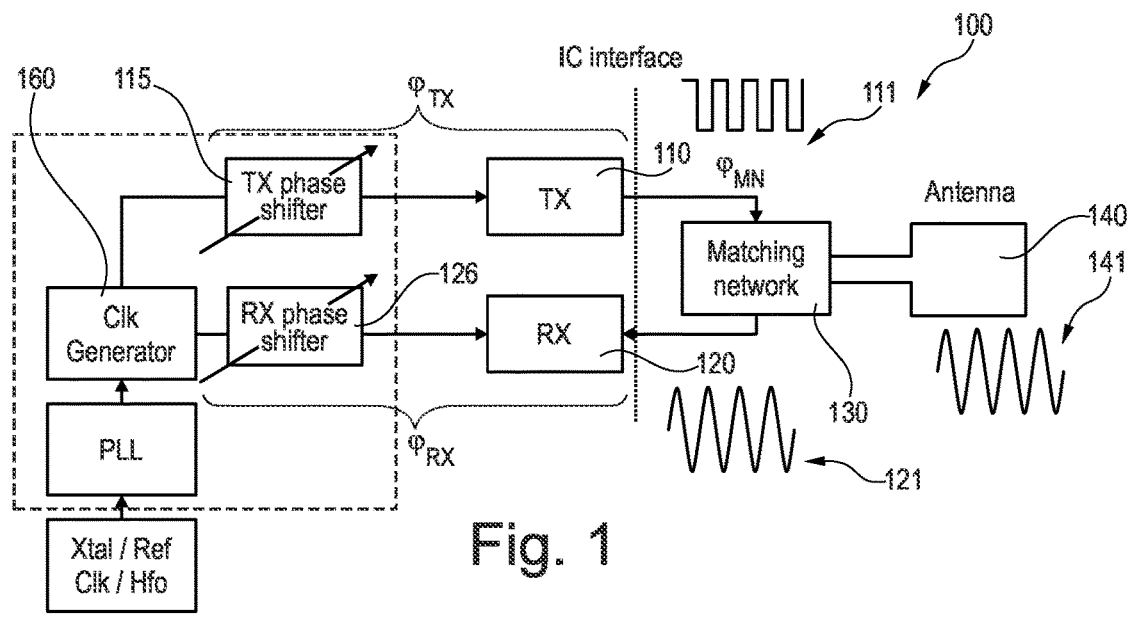
FIGS. 1 to 3 illustrate respectively an RFID device according to an exemplary embodiment of the present disclosure.

Before, referring to the drawings, embodiments will be described in further detail, some basic considerations will be summarized based on which embodiments of the disclosure have been developed.

According to an exemplary embodiment, the present disclosure makes it possible to achieve a small phase error in card emulation mode (CEM) and reader mode (RM) despite matching network RLC (resistor, inductor, capacitor) components spread. This may be achieved by the following calibration steps:
  i) an NFC device transmitter is configured to transmit a (RF) transmitter signal (square or continuous wave) through a matching network,
  ii) this RF signal is looped-back toward the NFC device receiver inputs through the matching network,
  iii) the NFC receiver contains a carrier cancelation loop (or DCO (DC offset) loop) which cancels the sampled carrier signal amplitude on an I-path and a Q-path,
  iv) the carrier cancelation loop I-and Q-control signals are used to estimate the phase shift through the matching network, and
  v) the phase shift is adjusted in the transmitter (and/or receiver) in order to compensate for the estimated phase shift, resulting in a constant-over-production phase at the antenna (CEM mode) and/or at the receiver mixer (reader mode).

According to a further exemplary embodiment, CEM and RM phase calibrations are addressed with a single measurement point using fully integrated measurement instruments. It relies on a carrier-cancelation loop of a receiver, synchronous receiver and transmitter, tuneable receiver and transmitter clocks, which are used to estimate and correct the delay between the transmitted transmitter signal and the received receiver (calibration) signal. This technique allows calibrating the transmitter/receiver clock phases during operation, which opens up new capabilities such as compensation of matching device detuning during operation.

FIG. 1 illustrates an RFID device 100 according to an exemplary embodiment of the present disclosure. The RFID device in this example is an NFC transceiver (e.g. implemented in an NFC phone) and comprises a transmitter 110, coupled to a transmitter phase shifter 115, and a receiver 120, coupled to a receiver phase shifter 126. Both, the transmitter 110 and the receiver 120, are further coupled to a clock generator 160 that is configured to synchronize the transmitter clock and the receiver clock and/or tune them independently. The clock generator 160 is further connected to a PLL (phase-locked loop) unit. Further, both of the transmitter 110 and the receiver 120, are coupled to a matching device 130 that comprises RLC components (see FIG. 6). The matching device 130 is further connected to an NFC antenna 140. In this manner, the receiver 120 is coupled (connected) via the matching device 130 to the transmitter 110 as a loop. In the example shown, the transmitter 110 and the receiver 120 are implemented in a common integrated circuit (IC) which is further connected to the matching device 130 and the antenna 140.

A phase shift, that occurs between the transmitter 110 and the matching device 130, is indicated as $\varphi_{MN}$. This phase shift has to be calibrated in particular for the CEM mode. Phase shifts between the transmitter 110, and the receiver 120 are indicated as $\varphi_{TX}$ and $\varphi_{RX}$, respectively. These phase shifts have to be calibrated (using the phase shifters 115, 126 and/or the clock generator 160) in particular for the reader mode.

The transmitter 110 is configured to transmit an unmodulated transmitter signal 111 (e.g. a square signal) via the matching device 130 to the receiver 120. In the present context, the transmitter signal 111, after it passed through the matching network 130, is termed calibration signal 121. The phase shift will be estimated based on this calibration signal 121 that carries a matching network phase shift information (delay, spread, etc.). The matching device 130 can process the transmitter signal, for example using a low pass filter. Therefore, in FIG. 1, the calibration signal 121 is shown as a sinusoidal signal in comparison to the square transmitter signal 111. Furthermore, an antenna signal 141 at the antenna 140 is shown, however, the antenna signal 141 does not interfere with the calibration signal 121.

Figure 7:
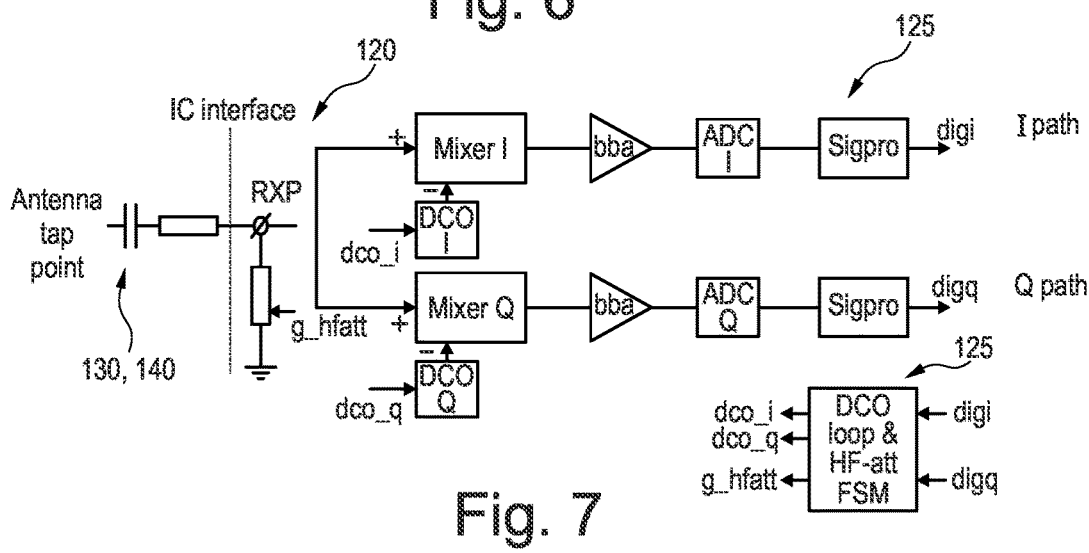
FIG. 7 illustrates a receiver with an estimation unit according to an exemplary embodiment of the present disclosure.

The receiver 120 is configured to estimate a phase shift of the calibration signal 121 through the matching network 130 using a carrier cancellation loop in an estimation unit (see details in FIG. 7). The NFC device 100 (in particular the transmitter phase shifter 115) is configured to adjust (compensate) the phase shift in order to compensate for the estimated phase shift.

Figure 2:
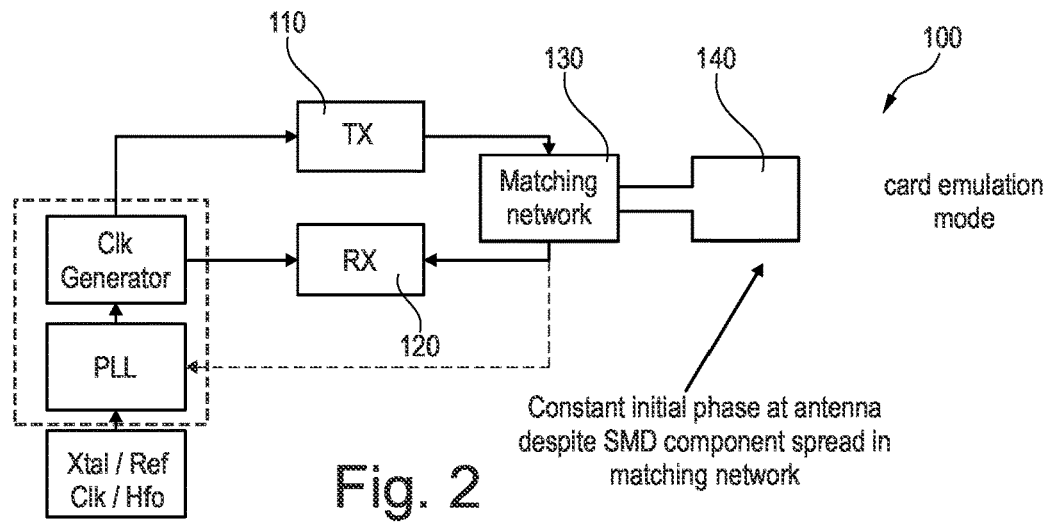

FIG. 2 illustrates an RFID device 100 according to an exemplary embodiment of the present disclosure that is in the CEM mode. It is indicated that there may be a need for a calibrated (constant) phase at the antenna 140 despite RLC components spread in the matching device 130.

Figure 3:
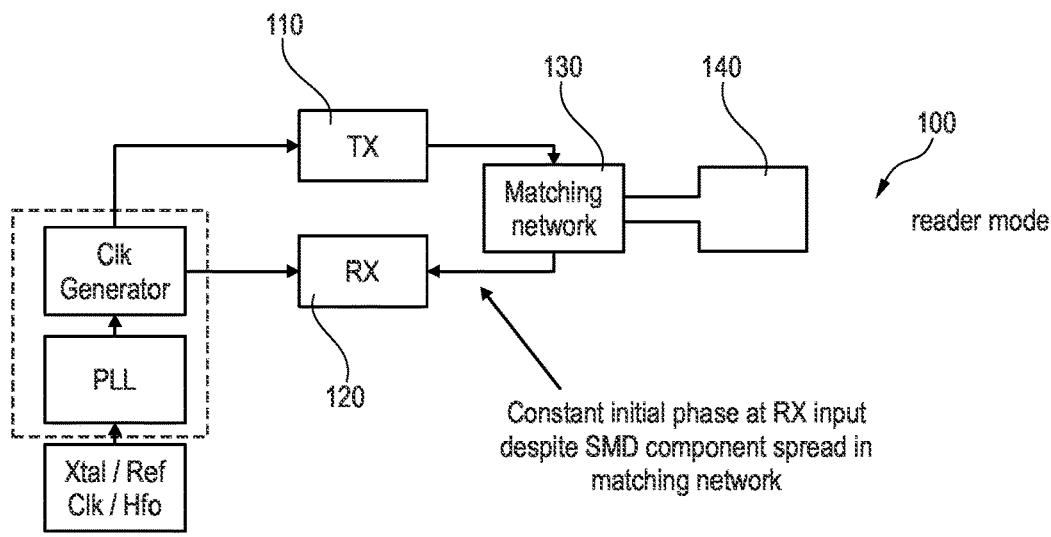

FIG. 3 illustrates an RFID device 100 according to an exemplary embodiment of the present disclosure that is in the RM mode. It is indicated that there may be a need for a calibrated (constant) phase at the receiver 120 input despite RLC components spread in the matching device 130.

Figure 4:
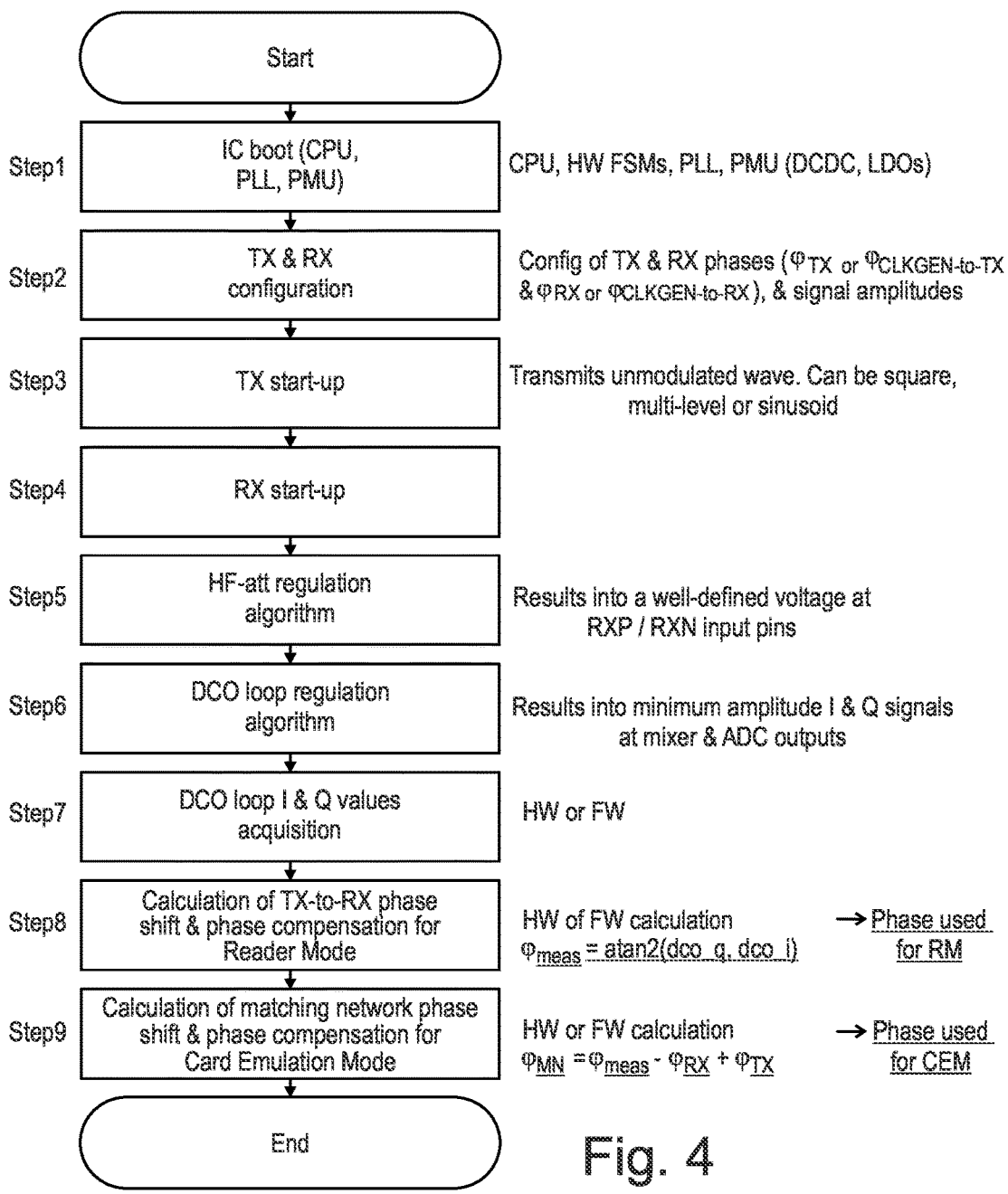
FIG. 4 illustrates a method of phase calibrating an RFID device according to an exemplary embodiment of the present disclosure.

FIG. 4 illustrates a method of phase calibrating an RFID device according to an exemplary embodiment of the present disclosure. The calibration algorithm can be implemented (for example in the NFC transceiver described for FIG. 1) as described in the following exemplary example:
1) after start-up, booting, and configuration, the transmitter (TX) 110 is transmitting an unmodulated signal (see step 3).
2) the transmitter 110 is connected to the matching device 130. A spread (offset) of the phase shift through the matching device 130 is mainly caused by the SMD components and the antenna (for example production spread on the inductors Le, La (see FIG. 6), and their associated parasitic components) and is reflected in the calibration signal 121. The present disclosure may also work for any other topology of matching device.
3) the matching device 130 has a feedback path (loop) towards the receiver (RX) 120 for the calibration signal 121.
4) the receiver 120 processes this calibration signal 121.
5) the receiver 120 can include an "HF-att" regulation loop (signal amplitude adjustment loop). This loop is run (see step 5) in order to get a signal amplitude at receiver P and/or receiver N close to a regulation loop target (predefined value). The loop can use a dichotomy approach or a more complex algorithm.
6) the receiver 120 includes a carrier cancellation (DC offset) loop in an estimation unit 125, which subtracts the estimated carrier amplitude from the sampled input calibration signal 121, independently on the I-path and the Q-path (see step 6). This loop ensures that the signals at an ADC output are both at their minimum (see FIG. 7 for details). Hereby, the I-path signal "dco_i" and the Q-path signal "dco_q" settle to the instantaneous carrier amplitudes which are carried out by the input signal at the receiver I-path and Q-path sampling instants. During a reader mode reception, this process allows adding gain between the mixer and the ADC to improve receiver sensitivity (receiver noise reduction), while not saturating the signal path (the carrier amplitude removal reduces the signal amplitude, which allows adding gain w/o causing saturation in the signal path). The loop algorithm can for instance use a dichotomy approach or a more complex algorithm.

7) For reader mode (RM): once the DC offset loop has settled, the transmitter-to-receiver phase shift can be calculated as (step 8): $\varphi_{meas}$=atan 2 (dco_q, dco_i). The Cordic algorithm might be used for example to calculate the phase shift from the I-path and the Q-path. $\varphi_{meas}$ is here the reference phase shift for the reader mode. The transmitter phase shifter 115 and/or the receiver phase shifter 126 settings are then modified by $\varphi_{meas}$ in order to configure the transceiver 100 at peak sampling or other sampling instants such as $\pi/4$-sampling. For example: if a peak sampling strategy is targeted and the measured phase shift is $\varphi_{meas}$=22°, the transmitter phase shifter 115 setting shall be reduced by 22°. Alternatively, the receiver phase shifter 126 could be increased by 22°. Any phase shift partitioning between the transmitter phase shifter and the receiver phase shifter may also be valid.

8) For card emulation mode (CEM): the (IC internal) phase shifts are de-embedded from the measured phase shift (step 9): $\varphi_{MN}=\varphi_{meas}-\varphi_{IC}$ or $\varphi_{meas}-\varphi_{RX}+\varphi_{TX}$. $\varphi_{MN}$ is the phase shift through the matching device 130, and as such is the relevant phase shift for CEM. The optimum transmitter phase shift can be modified in order to compensate for this phase shift: $\varphi_{TX}=-\varphi_{MN}$, and guarantee a constant-over-production antenna signal phase.

It should be noted that additional steps could be taken in the phase calibration. For instance, calibration against internal ICs errors could be added depending on the transceiver characteristics.

Figure 5:
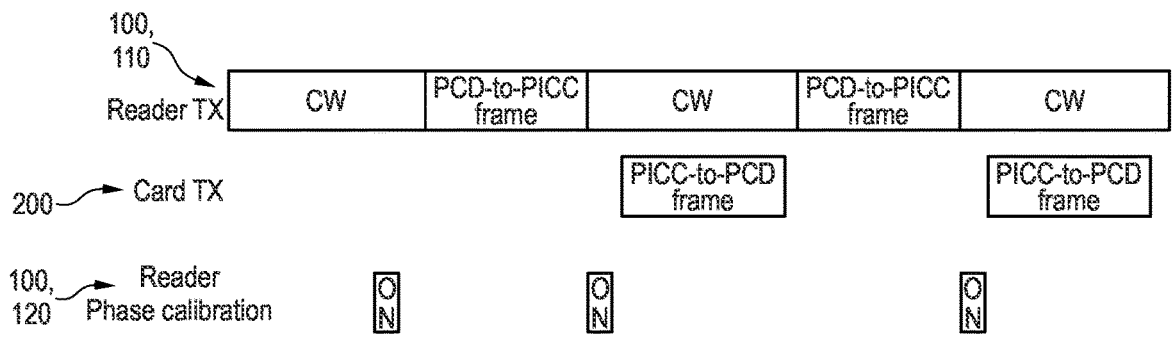
FIG. 5 illustrates a method of phase calibrating an RFID device in real-time according to an exemplary embodiment of the present disclosure.

FIG. 5 illustrates a method of phase calibrating an RFID device 100 in real-time according to an exemplary embodiment of the present disclosure, when calibration is launched before and during a transaction (i.e. calibration algorithm for real-time implementation). In other words, the calibration method is performed when the RFID device 100 is coupled (in communication) with a further RFID device 200. In particular, when no modulation of signals communicated between the RFID device 100 and the further RFID device occurs, the phase calibration method is applied. In the example shown, the RFID device 100 is a (card) reader (PCD, proximity-coupling device) device) with the transmitter 110 and the receiver 120, while the further RFID device 200 is a (smart) card (PICC, proximity integrated circuit card) with a transmitter.

The coupling/communication starts with an unmodulated signal (continuous wave, CW) of the RFID device 110. Then, a modulated signal (PCD-to-PICC frame) is communicated from RFID device 100 to the further RFID device 200 which, after a short duration, transmits a further modulated signal (PICC-to-PCD frame) to the RFID device 100. In the example shown, the above described phase calibration (indicated as "ON") is applied at the receiver 120 of the RFID device 100, when no modulated signal is transferred between RFID device 100 and the further RFID device 200. In such a way, it is possible to maintain the PCD receiver sampling instants independent from the proximity card coupled device (PICC) position, even under strong detuning conditions.

Figure 6:
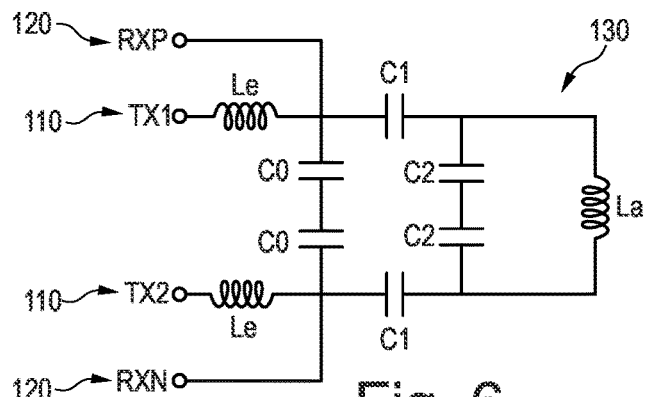
FIG. 6 illustrates a matching device according to an exemplary embodiment of the present disclosure.

FIG. 6 illustrates a matching device 130 connected to a transmitter 110 and a receiver 120 according to an exemplary embodiment of the present disclosure. In this example, a balanced matching network with RLC components is shown.

FIG. 7 illustrates a receiver 120 with an estimation unit 125 according to an exemplary embodiment of the present disclosure. The receiver architecture includes a carrier cancellation calibration loop (or DC offset (DCO) loop). The receiver 120 is configured to sample the amplitude of the calibration signal 121. The receiver 120 is further configured to subtract the sampled amplitude of the calibration signal 121 in an I-path and a Q-path. The phase shift is estimated based on the obtained I-path signal "dco_i" and the Q-path signal "dco_q". The estimation unit 125 may run a plurality of loops, for example around ten. Additionally, the estimation unit 125 is partially implemented as a signal amplitude regulation unit (HF-att) configured to provide a signal amplitude close to a predefined value (see signal "g-hfatt"). Even though FIG. 7 shows a single-ended signal path, the signal path could also be differential.

Figure 8:
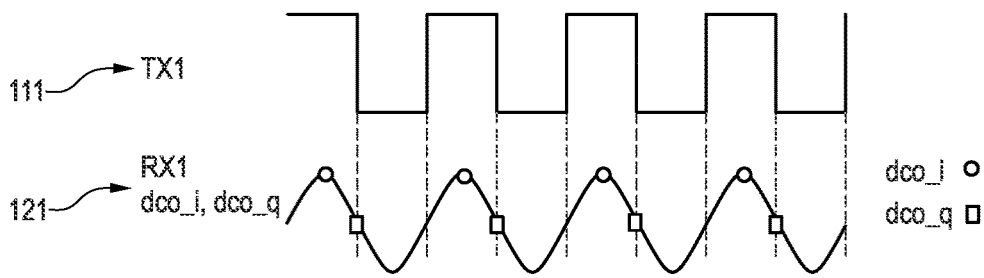
FIGS. 8 and 9 illustrate respectively sampling amplitudes of the calibration signal.
Figure 9:
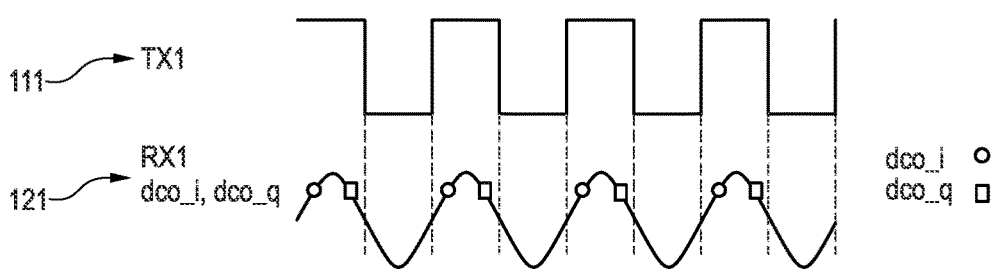

FIG. 8 illustrates a sampling of the calibration signal 121 with a DC offset calibration steady state in peak sampling configuration, while FIG. 9 illustrates a sampling of the calibration signal 121 with a DC offset calibration steady state in π/4 sampling configuration. It shall be noticed that the receiver is illustrated to have a sampling rate equal to the carrier frequency but could include some oversampling factor as well. Typically, this oversampling could be in the range of 2 to 8.

In this specification, embodiments have been presented in terms of a selected set of details. However, a person of ordinary skill in the art would understand that many other embodiments may be practiced which include a different selected set of these details. It is intended that the following claims cover all possible embodiments.

REFERENCE NUMERALS

100 RFID device, NFC transceiver
110 Transmitter
111 Transmitter signal
115 Transmitter phase shifter
120 Receiver
121 Calibration signal
125 Estimation unit
126 Receiver phase shifter
130 Matching device
140 Antenna
141 Antenna signal
160 Clock generator
200 Further RFID device

The invention claimed is:

1. A radio frequency identification (RFID) device, comprising:
   a transmitter;
   a matching device; and
   a receiver that includes an estimation unit and at least one receiver input coupled to the matching device;
   wherein the transmitter is coupled via the matching device to the at least one receiver input;
   wherein the transmitter is configured to transmit a transmitter signal, which is looped-back through the matching device to the at least one receiver input, and wherein the looped-back transmitter signal at the at least one receiver input corresponds to a calibration signal;
   wherein the receiver is configured to receive the calibration signal from the matching device at the at least one receiver input, to sample an amplitude of the calibration signal in order to produce a sampled amplitude of the calibration signal, to obtain an I-path signal and a Q-path signal based on the sampled amplitude, and to estimate, by the estimation unit, an estimated phase shift through the matching device of the calibration signal based on the obtained I-path signal and the obtained Q-path signal; and
   wherein the RFID device is configured to adjust at least one of a transmitter phase shift and a receiver phase shift in order to compensate at least partially for the estimated phase shift.

2. The RFID device according to claim 1, wherein adjusting at least one of the transmitter phase shift and the receiver phase shift results in a calibrated phase at the receiver in a reader mode.

3. The RFID device according to claim 2, wherein the receiver is further configured to:
   adjust said phase shift in order to obtain the calibrated phase at the receiver in the reader mode.

4. The RFID device according to claim 1, wherein the RFID device further comprises:
   an antenna, coupled to the matching device; and
   wherein adjusting at least one of the transmitter phase shift and the receiver phase shift results in a calibrated phase at the antenna in the card emulation mode.

5. The RFID device according to claim 4, wherein the RFID device is further configured to:
   determine a phase shift at the matching device; and
   adjust said phase shift in order to obtain the calibrated phase at the antenna in the card emulation mode.

6. The RFID device according to claim 1, wherein:
   the estimation unit comprises a carrier cancelation loop that is configured to subtract a sampled carrier signal amplitude from the I-path signal and from the Q-path signal, resulting in a carrier cancelation loop I-control signal and a carrier cancelation loop Q-control signal; and
   the estimation unit is configured to estimate the estimated phase shift of the calibration signal based on the carrier cancelation loop I-control signal and the carrier cancelation loop Q-control signal.

7. The RFID device according to claim 1, further comprising:
   a transmitter phase shifter, coupled to the transmitter, and configured to adjust the transmitter phase shift in order to at least partially compensate for the estimated phase shift.

8. The RFID device according to claim 1, further comprising:
   a receiver phase shifter, coupled to the receiver, and configured to adjust the receiver phase shift in order to at least partially compensate for the estimated phase shift.

9. The RFID device according to claim 1, further comprising a clock generator coupled to the transmitter and the receiver, wherein the clock generator is configured to perform at least one of synchronize a transmitter clock and a receiver clock, or tune the transmitter clock or the receiver clock.

10. The RFID device according to claim 1, wherein the transmitter signal is an unmodulated signal.

11. The RFID device according to claim 1, wherein the receiver further comprises a signal amplitude regulation unit configured to provide a signal amplitude close to a predefined value.

12. The RFID device according to claim 1, wherein the RFID device is a near field communication device.

13. The RFID device according to claim 1, wherein the matching device comprises a network of at least one inductor and at least one capacitor.

14. A method of phase calibrating a radio frequency identification (RFID) device, the method comprising:
   transmitting, by a transmitter of the RFID device, an unmodulated transmitter signal, which is looped-back through a matching device of the RFID device to at least one input of a receiver of the RFID device, wherein the looped-back transmitter signal at the at least one input of the receiver corresponds to a calibration signal;

receiving, by the receiver of the RFID device, the calibration signal from the matching device;

sampling, by the receiver, an amplitude of the calibration signal in order to produce a sampled amplitude of the calibration signal;

obtaining, by the receiver, an I-path signal and a Q-path signal based on the sampled amplitude;

estimating, by an estimation unit of the receiver, an estimated phase shift through the matching device of the calibration signal based on the obtained I-path signal and the obtained Q-path signal; and adjusting at least one of a transmitter phase shift and a receiver phase shift, within the RFID device, in order to compensate at least partially for the estimated phase shift.

15. The method according to claim 14, wherein the method is performed when the RFID device is coupled with a further RFID device.

16. The method according to claim 15, wherein the method is performed when there is no modulation of signals communicated between the RFID device and the further RFID device.

17. The method according to claim 14, wherein transmitting the unmodulated signal through the matching device comprises transmitting the unmodulated signal through a network of at least one inductor and at least one capacitor.

* * * * *